United States Patent [19]
Thien et al.

[11] 3,988,948
[45] Nov. 2, 1976

[54] INTERNAL COMBUSTION ENGINE WITH TORSIONAL-VIBRATION BALANCER

[75] Inventors: Gerhard Thien; Heinz Fachbach, both of Graz, Austria

[73] Assignee: Hans List, Graz, Austria

[22] Filed: Mar. 4, 1975

[21] Appl. No.: 555,238

Related U.S. Application Data

[63] Continuation-in-part of Ser. No. 405,303, Oct. 11, 1973, abandoned.

[30] Foreign Application Priority Data

Oct. 13, 1972 Austria .............................. 8818/72

[52] U.S. Cl. .............................. 74/574; 74/573 F; 416/60
[51] Int. Cl.[2]......................................... F16F 15/10
[58] Field of Search .......... 74/574, 572, 573, 573 F; 416/60; 123/192 B, 41.31

[56] References Cited
UNITED STATES PATENTS

| | | | |
|---|---|---|---|
| 1,687,541 | 10/1928 | Carmichael | 416/60 |
| 1,692,376 | 11/1928 | Jupp | 416/60 |
| 3,077,123 | 2/1963 | Katzenberger | 74/574 |

*Primary Examiner*—Charles J. Myhre
*Assistant Examiner*—Daniel J. O'Connor
*Attorney, Agent, or Firm*—Watson, Cole, Grindle & Watson

[57] ABSTRACT

An internal combustion engine comprising a torsional-vibration balancer mounted on one end of the crankshaft and carrying a fan-wheel blower, said torsional-vibration balancer being enclosed in a sound-absorbing casing having an admission aperture and a discharge aperture for the cooling air.

6 Claims, 1 Drawing Figure

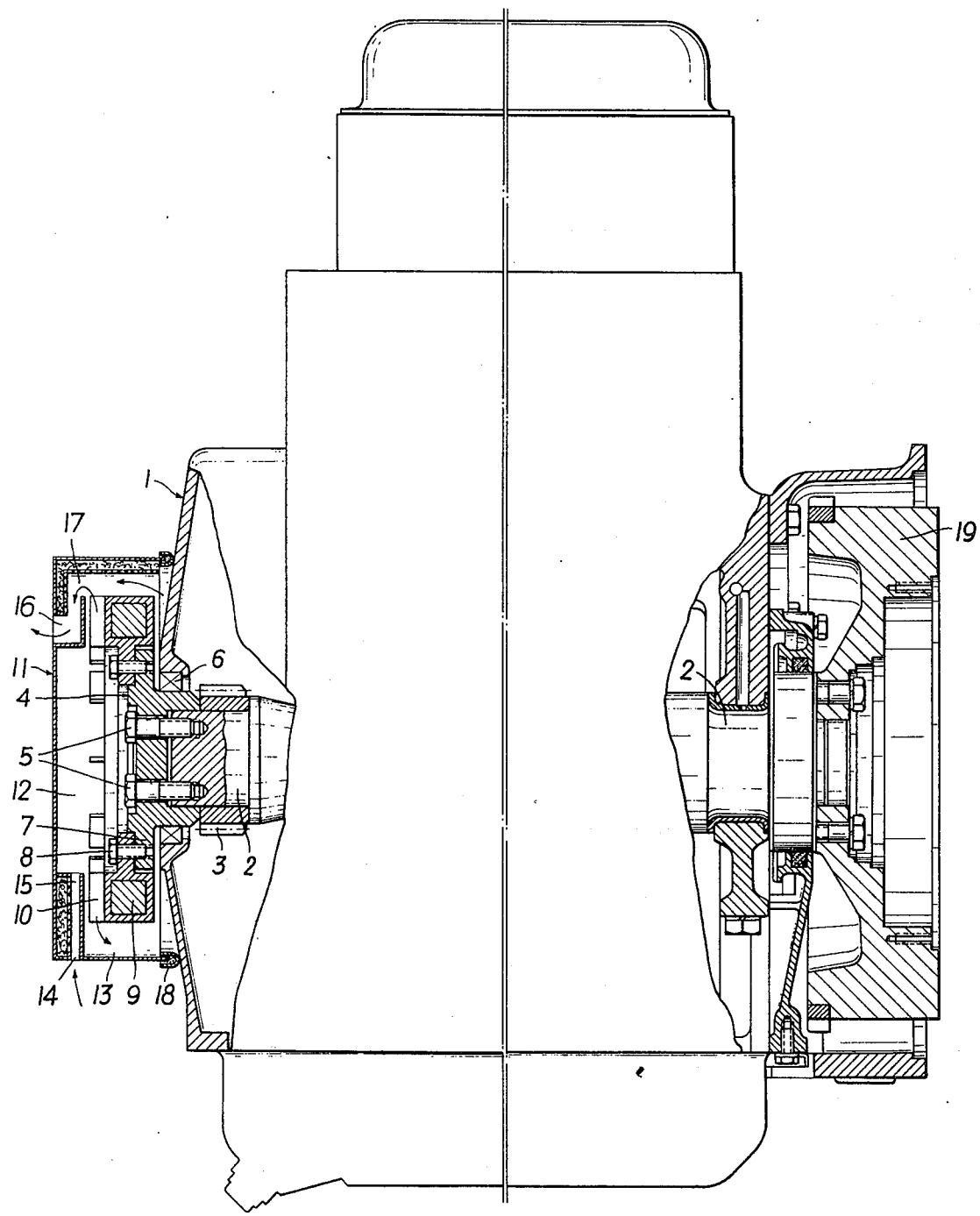

INTERNAL COMBUSTION ENGINE WITH TORSIONAL-VIBRATION BALANCER

This case is a continuation-in-part of Ser. No. 405,303, filed Oct. 11, 1973 now abandoned.

The invention relates to an internal combustion engine with a torsional-vibration balancer mounted on the crankshaft end opposite the flywheel inside a sound-proofing casing.

The control wheel can be mounted on either end of the crankshaft, i.e., either on the same end as the flywheel or the opposite end. The torsional-vibration balancers, however, are mounted on the crankshaft end opposite the flywheel outside the engine housing. Such torsional-vibration balancers frequently produce considerable noise on this side of the engine, particularly with engines of the hard-combustion type. A known solution of the problem of reducing the noise radiation of similar torsional-vibration balancers consists in the provision of a plain sound-proofing casing. However, this greatly impairs the heat emission of the balancer as a result of which the balancer may even be destroyed.

It is the purpose of the present invention to improve upon the design of an internal combustion engine of the type hereabove described in such a manner as to positively eliminate the risk of overheating the torsional-vibration balancer. According to the invention the torsional-vibration balancer carries a fan-wheel blower in a manner known per se on its secondary side for the purpose of evacuating the heat from the casing, the blower housing being formed by a sound-proofing casing provided with an aperture for the admission of cooling air at the suction end of the blower and with an aperture for the discharge of the cooling air at the delivery end. Thus adequate cooling of the torsional-vibration balancer is ensured in any case at very low structural cost while the sound-proofing casing fully retains its acoustic efficiency. The cooling air sweeps over both the peripheral and front surfaces of the balancer and evacuates excess heat through the aperture for the discharge of the cooling air rapidly into the open air.

According to another embodiment of the invention, both the cooling-air admission and the cooling-air discharge apertures each are provided with a sound-absorber so as to positively suppress the emergence of sound transmitted by air from the blower housing.

In such cases where the engine housing also contributes essentially towards the overall noise production, it is advisable according to the invention to design the sound-proofing casing forming the blower housing so as to cover also the engine housing or at least part of it.

Finally, according to the invention it is particularly advisable to design the blower as a radial blower, in which case the blower wheel can be of approximately the same external diameter as the torsional-vibration balancer, so that in addition to a comparatively high flow velocity of the cooling air the very compact design of the sound-proofing housing offers an additional advantage.

Further details of the invention will become apparent from the following description of an embodiment of the invention with reference to the accompanying drawing showing a sectional view of an internal combustion engine according to the invention covering only the area which is essential for the understanding of the invention and including a vertical plane containing the crankshaft axis. In the embodiment shown in the drawing the engine comprises a control gear provided on the end of the engine opposed the flywheel of the engine. Therefore the engine housing at said end of the engine is formed as a control gear housing.

The control wheel 3 and the sleeve 4 serving to secure the axial position of the control wheel 3 is attached to one end of the crankshaft 2 of the internal combustion engine located inside the control wheel housing 1 by means of bolts 5. The sleeve 4 is sealed off by means of a circumferential joint 6 where it passes through the control wheel housing 1. To a collar 7 of the sleeve 4 the torsional-vibration balancer 9 is attached by means of bolts 8. A flywheel 19 is shown as being mounted on the end of the crankshaft 2 opposite the torsional-vibration balancer 9.

At its outer front face the torsional-vibration balancer 9 carries a blower wheel 10 acting as a radial blower. The torsional-vibration balancer 9 together with the blower wheel 10 are covered by means of a sound-proofing casing 11 forming a blower housing with a suction chamber 12 and a delivery chamber 13. The suction chamber 12 communicates with a cooling-air admission aperture 14 provided with an admission sound-absorber 15. The delivery chamber 13 of the blower wherein the torsional-vibration balancer 9 is located, communicates with a cooling-air discharge aperture 16 having a cooling-air discharge sound-absorber 17 provided in front of it.

The sound-proofing casing 11 is attached to the engine housing, in the embodiment shown formed by the control wheel housing 1 with the interposition of an elastic joint 18 in a manner not shown in the drawing so as to absorb sound conducted through solids.

The presence of the fan-wheel blower 10 produces inside the sound-absorbing casing 11 a cold-air current of great intensity in the direction indicated by arrows in the drawing. This current positively protects the torsional-vibration balancer 9 from overheating which otherwise would be inevitable because the sound-absorbing casing 11 is liable to impair any radiation of heat.

We claim:

1. An internal combustion engine with a torsional-vibration balancer mounted at one end of the crankshaft, comprising a fan-wheel blower attached to an outer front face of said torsional-vibration balancer, a sound-proofing casing covering said torsional-vibration balancer and said fan-wheel blower and defining a blower housing for said fan-wheel blower, said casing having a cooling-air admission aperture connected with the suction end of the blower and a cooling-air discharge aperture connected with the delivery end of the blower.

2. An internal combustion engine according to claim 1, further comprising two sound-absorbers arranged inside said casing, one sound absorber being located in the area of said cooling-air admission aperture and the other in the area of said cooling-air discharge aperture.

3. An internal combustion engine according to claim 1, further comprising an engine housing in the area of the extremity of the crankshaft carrying the torsional-vibration balancer, said sound-proofing casing covering at least also part of said engine housing.

4. An internal combustion engine according to claim 1, further comprising a control wheel housing in the area of the extremity of the crankshaft carrying the torsional-vibration balancer, said sound-proofing casing covering at least also part of said control wheel housing.

5. An internal combustion engine according to claim 1, wherein said blower is designed as a radial blower.

6. An internal combustion engine according to claim 1, further comprising a flywheel mounted on said crankshaft at the opposite end from said torsional-vibration balancer.

* * * * *